(12) United States Patent
Yeh

(10) Patent No.: US 6,261,450 B1
(45) Date of Patent: Jul. 17, 2001

(54) MAGNETIC SOURCE DEVICE

(76) Inventor: Hai-Kun Yeh, NO.56, Min Sheng Street, Feng-Yuan City 42041 (TW)

( * ) Notice: Subject to any disclaimer, the term of this patent is extended or adjusted under 35 U.S.C. 154(b) by 0 days.

(21) Appl. No.: 09/448,212

(22) Filed: Nov. 23, 1999

(51) Int. Cl.[7] ............................... B01D 35/06; C02F 1/48

(52) U.S. Cl. .......................... 210/222; 210/695; 335/304

(58) Field of Search ..................................... 210/222, 695; 335/304, 306; 123/538

(56) References Cited

U.S. PATENT DOCUMENTS 5,356,534 * 10/1994 Zimmerman et al. ............... 210/222

* cited by examiner

Primary Examiner—David A. Reifsnyder

(57) ABSTRACT

The present invention of a magnetic source and condenser is applied directly outside on a pipe. The magnetic device comprises a series of iron pieces having curved contact surfaces on the same side, a magnet is placed between every two piece of iron, the magnets with faces closed to one another have the same pole, thus strong magnetic force is generated by the repelling of the same pole of the two magnets, the series of iron pieces and the magnets are surrounded a frame on their sides to fix and protect the magnets from outside factors.

1 Claim, 6 Drawing Sheets

MAGNETIC SOURCE DEVICE

FIELD OF THE INVENTION

The present invention relates to a magnetic source and condenser and more particularly to a magnetic source and condenser that uses two pieces of magnets with the same pole to generate strong magnetic force to protect pipes from scale, corrosion, algae, paraffin, etc. It also helps fuel in engines to combust more completely, to reduce amount of carbon accumulation.

BACKGROUND OF THE INVENTION

Water circulates inside devices such as pipes system and furnace and generates electric currents and charges. Thus an electric potential difference is created between the pipe and the water with the pipe having positive charge and attracts calcareous and vitriolate anions dissolved in the circulating water. The anions then form undissolvable calcareous, magnesia, vitriolate calcium and magnesium water stains accumulated on the pipe to affect heat exchange efficiency. The positively charged pipe also gets corroded by the electronegative oxides. In addition, the negatively charged membrane of algae attracted on the pipe causes corrosion and affect the heat exchange efficiency.

Conventional water treatment methods include adding chemicals which can slow down the corrosion process but the chemicals are harmful to the workers and the environment, the cost is very high also. Using acidic chemicals which is corrosive to the pipe and shorten its life. Another one is stop the operation and cut the pipe for connecting to a water treatment device but is relatively ineffective. Yet another method is reverse osmosis, a high pressure water current must be used in order to pass the membrane. After a period of time, organic matters will accumulate on the membrane and needed to change for a new one.

In order to have a more complete combustion of fuel used in engines, the hydrocarbon molecules in fuel must combine with oxygen. Since they both are negative and repel one another, fuel in engines can not combust completely and cause carbon accumulation in cylinders to pollute the air.

A magnetic device found in the markets is used on pipes as shown in FIG. 6. It employs a piece of magnet 1 having a pair of iron pieces 2 and 3 sandwiching the magnet 1. Because the magnet 1 itself has N and S pole, the iron 2 is affected by the N pole and thus carries an N magnetic field, the iron 3 is affected by the S pole and thus carries a S magnetic field. A device 4 having two opposite poles attractive to each other is put outside on a pipe 5 to protect it from corrosion by the water. Its drawback is that the magnetic force generated by only one piece of magnet is relatively weak and thus is ineffective.

Other drawbacks are as follows:

1) if the device 4 is attached on water pipe, many sets of devices are needed so that it is not easy to tell which one is S pole or N pole, also installation is not convenient;
2) weak magnetic field;
3) weak penetration of magnetic field if water pipe is too thick;
4) if applied in furnace and the concentration rises up to 1,000 PPM, then it is necessary to discharge water. Large amount of water is wasted and negative charge of ions is too low, thus causes shortage of water vapor which is not practical to be used in the industry;
5) if applied in water pipe with 2 or 3 inches in diameter, the effect of removing residue and rust is acceptable. But the magnetic force formed by the opposite poles is rather uneven and weak if applied in water pipe with 6 inches in diameter;
6) pipe system of furnace must be cleaned with acidic treatment first before installation of magnetic device, thus pipes can easily be damaged.

SUMMARY OF THE PRESENT INVENTION

The present invention is a magnetic device used on pipes which comprises a series of iron pieces. A magnet is placed between every two pieces of iron. Thus two pieces of magnets having faces with the same charged poles repel one another to generate strong magnetic force. A stainless steel frame wraps around the magnets and the iron pieces on their sides. Its main objective is to help saving water and electricity as well as to protect the environment from pollution, and to provide a means for ease of maintenance without having to stop the operation and at the same time can lengthen the life of equipment. Yet another objective is effectively mix the hydrocarbon molecules and oxygen for more complete combustion in order to same fuel and cut down on air pollution. The last objective is to provide magnetic device which can be assembled conveniently and quickly.

The present invention can generate a stronger magnetic force which is about 50% more than a conventional magnetic device which has the problem of distinguishing the S and N poles on different magnetic device sets. On the contrary, the present invention has the same pole on its two faces which is easy to be arranged on pipes. Lastly, one set of the present invention can generate the same magnetic force equals to using two sets of the conventional magnetic device, which makes it more convenient to install.

The present invention will become more fully understood by reference to the following detailed description thereof when read in conjunction with the attached drawings.

DETAILED DESCRIPTION OF THE PREFERRED EMBODIMENT

The present invention has a main objective to protect pipes from corrosion by using a magnetic force as well as to mix the hydrocarbon molecules and the oxygen more effectively to let the fuel combust more completely.

Figure 1:
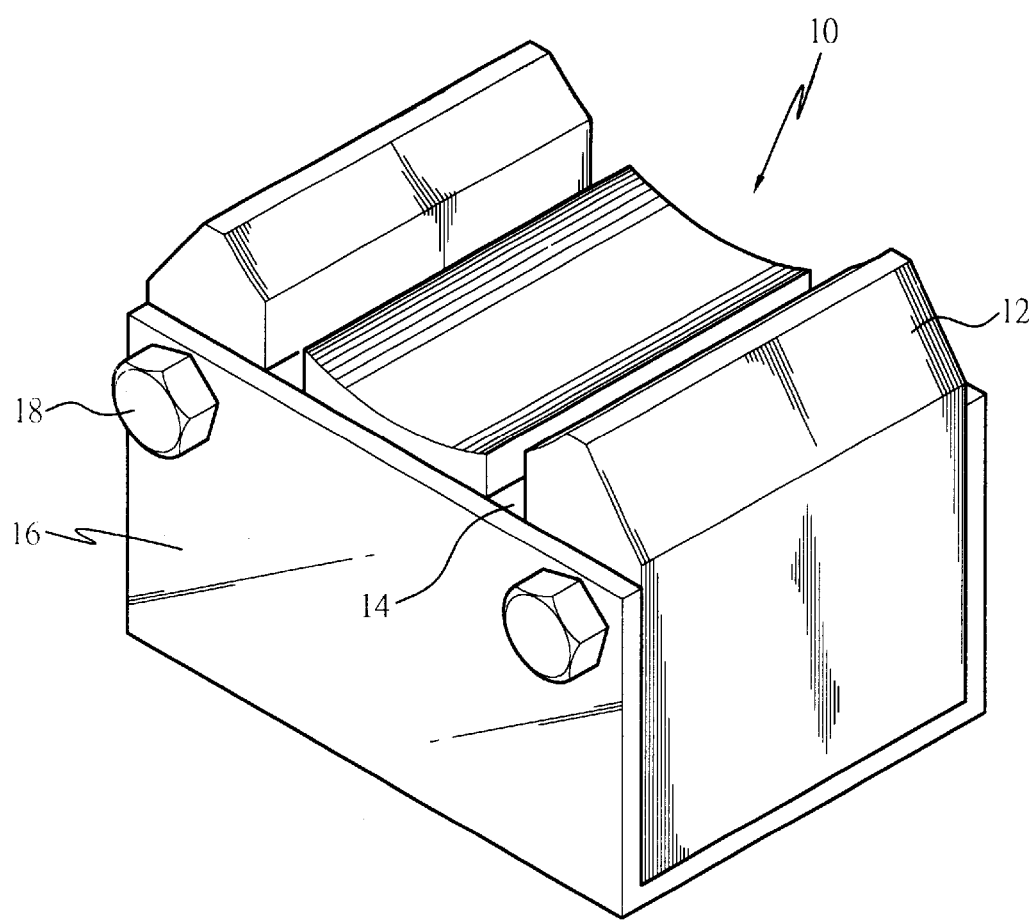
FIG. 1 is a perspective view of the present invention.
Figure 2:
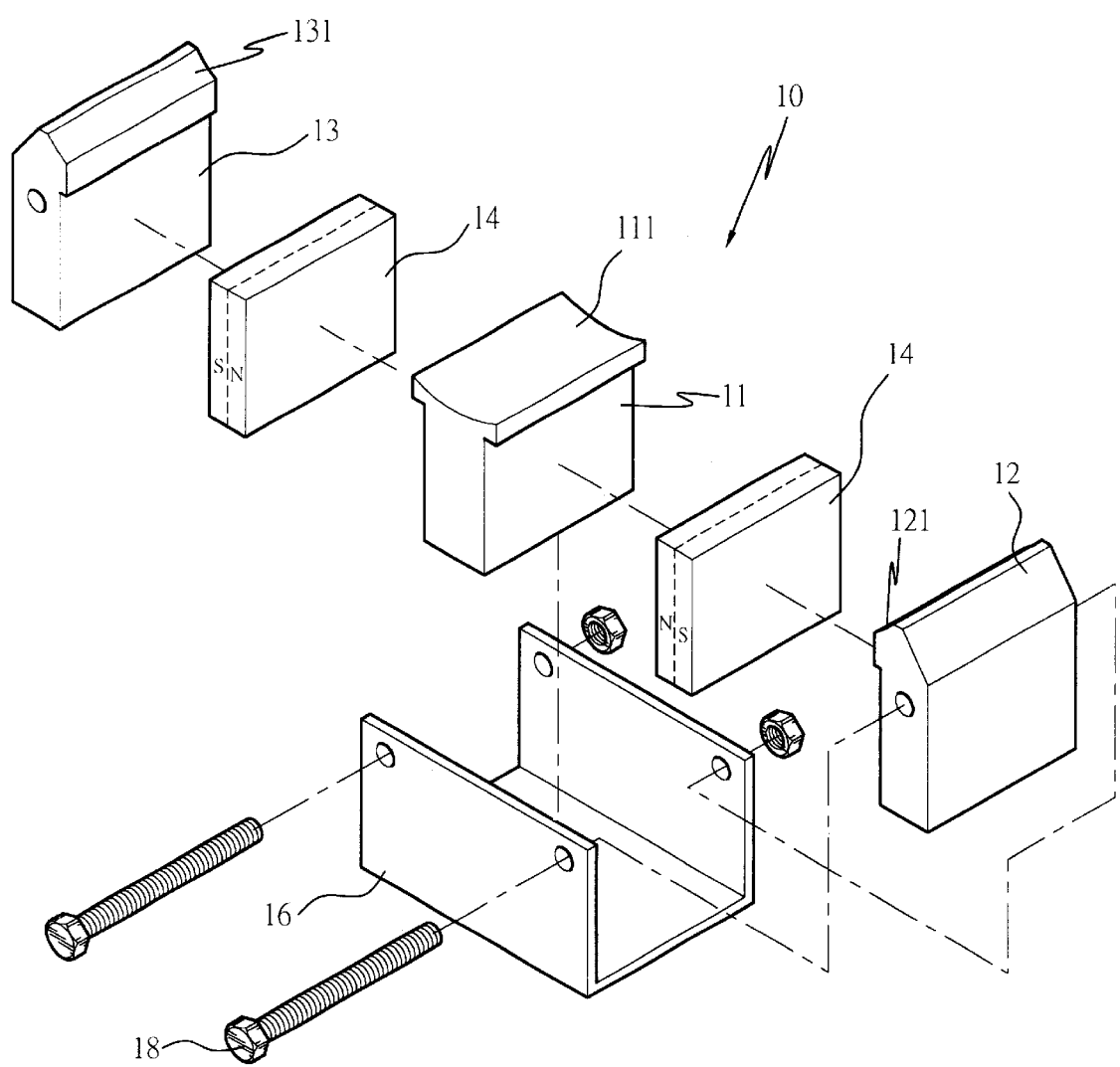
FIG. 2 is an exploded perspective view of the present invention.
Figure 3:
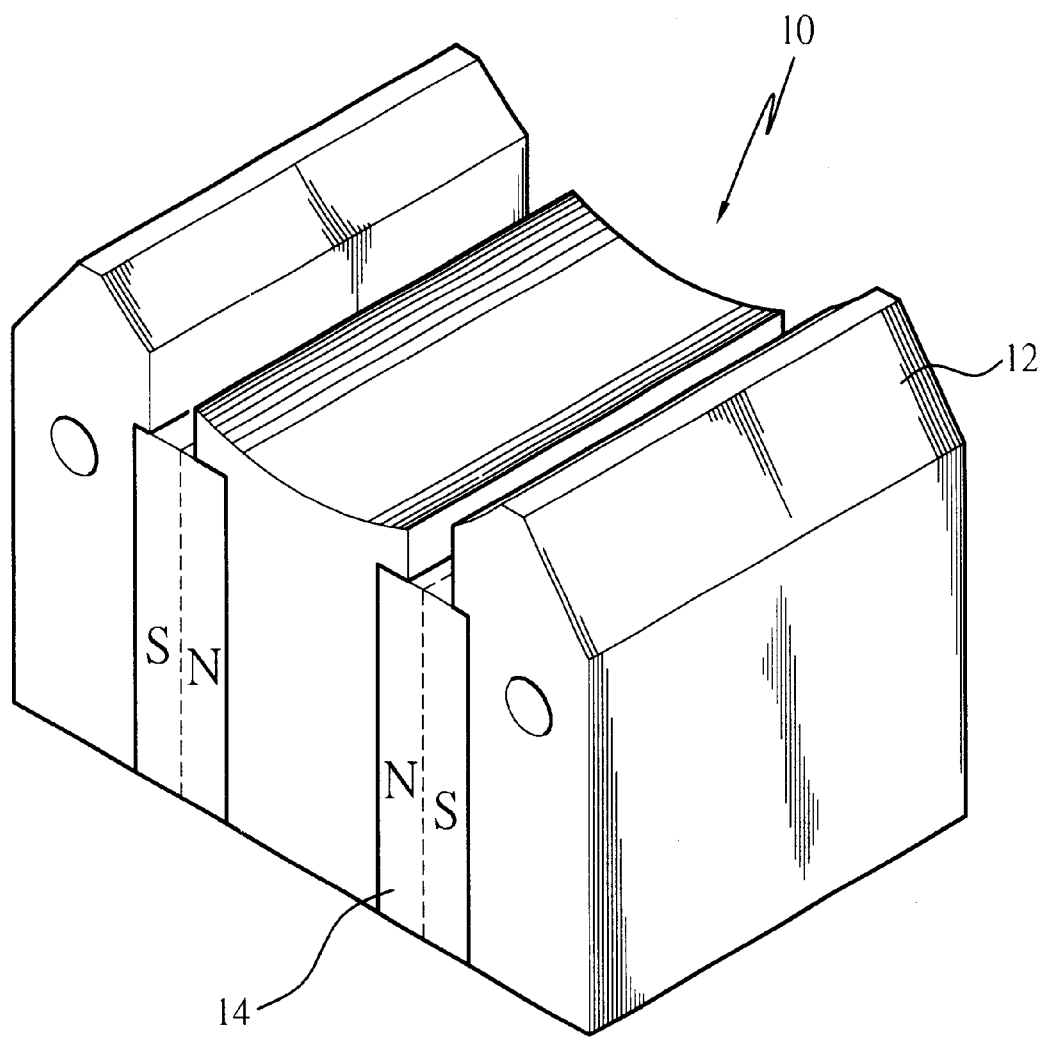
FIG. 3 is a perspective assembly view of the present invention.

Referring to FIGS. 1 and 2, a magnetic device 10 comprises a series of iron pieces 11, 12 and 13 with curved contact surfaces 111, 121 and 131 on their tops respectively for placing on pipes. A magnet 14 is placed between every two pieces of iron 11 and 12 as well as 11 and 13 to attract iron pieces 11 and 12 as well as 11 and 13 next to the magnets 14. The faces of the magnets 14 closed to the iron piece 11 are both N pole, while the faces closed to the iron pieces 12 and 13 are both S pole. Thus strong magnetic force is generated because of the same pole repels one another. A stainless steel frame 16 wraps around the two magnets 14 and the iron pieces 11, 12 and 13 on their sides. Screws 18 are used to fix the frame 16, thus the magnets 14 are wrapped around by the frame 16 to protect it from outside factors.

Vice versa, the faces of the magnets 14 closed to the iron piece 11 can both be S pole, while the faces closed to the iron pieces 12 and 13 can both be N pole.

The magnets 14 are made by materials which feature permanent magnetic field.

Figure 4:
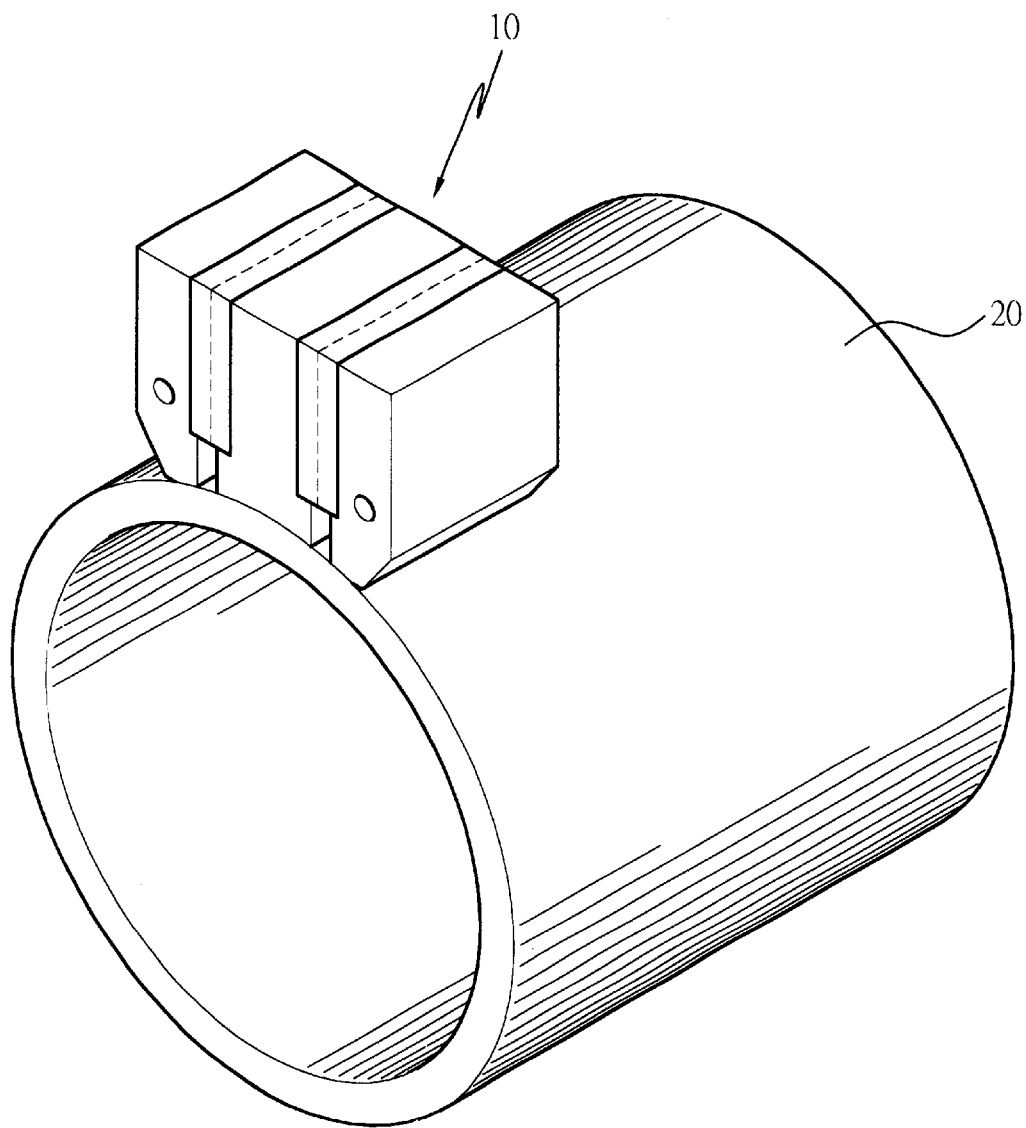
FIG. 4 is a perspective view of the present invention applied on a pipe.
Figure 5:
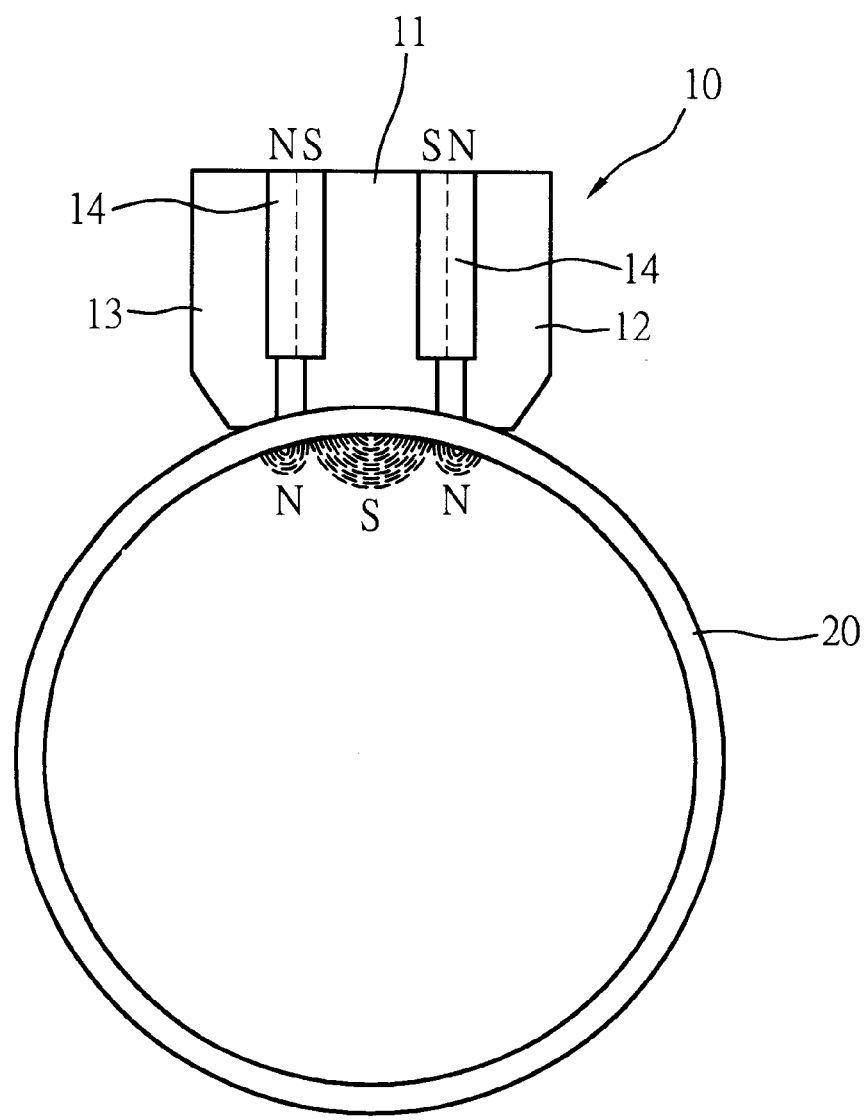
FIG. 5 is a sectional plane view of the present invention with magnetic field lines shown inside a pipe.
Figure 6:
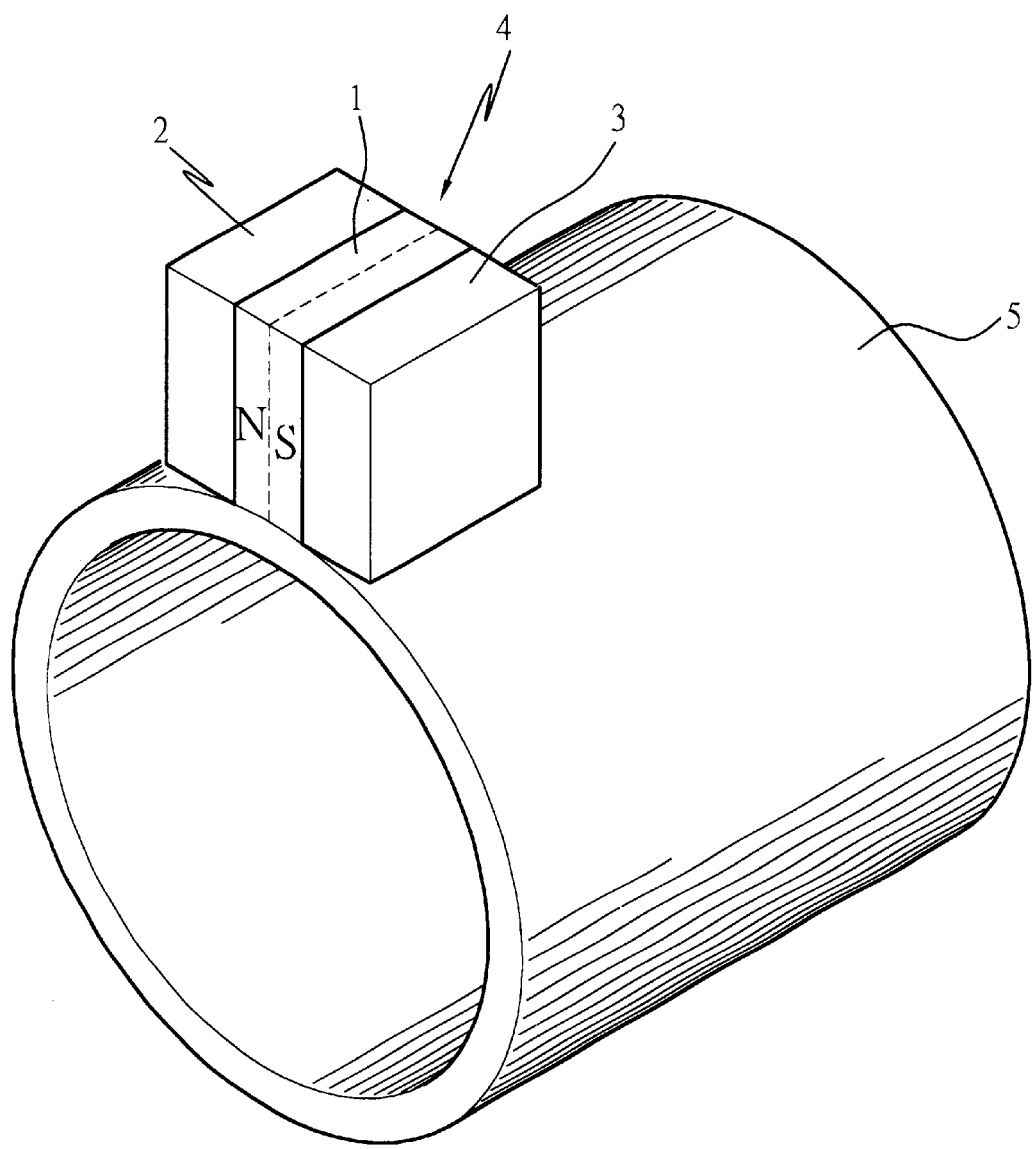
FIG. 6 is a perspective view of a conventional magnetic device applied on a pipe.

Referring to FIGS. 4 and 5, the present invention is applied on a pipe 20. The curved contact surfaces 111, 121 and 131 are attracted outside on the pipe 20 which is a very convenient and easy installation job without using any tools. The magnetic device 10 has a magnetic force of more than 30,000 gausses which makes it very easy to penetrate through the pipe 20. Magnetic field is generated inside the pipe 20. The flowing fluid cutting the perpendicular lines of magnetic flux generate electrical currents and charges in the fluid. Thus inside the pipe 20 is negatively charged and is able to repel the negative dissolvable anions, oxygen and algae, in order to protect the pipe 20 from scale, corrosion, algae and paraffin.

If the pipe 20 has already been corroded, the magnetic device 10 can also be applied to ionize the water to attract the hydrogen ions on the pipe 20, in order to dissolve the corrosive residues to help the system to operate normally.

The magnetic device 10 can protect the pipe 20 or any other water circulating systems from corrosion, and at the same time the environment is free from pollution too. In addition, it doesn't need electric power and is installed outside the pipe system which is convenient and is not necessary to have to turn off the system.

If it is applied on fuel transmission systems, the magnetic field generated can help the fuel to combust more completely by effectively mixing the hydrogen and the oxygen molecules, to turn the hydrocarbon molecules into carbon dioxides and water, and generate huge amount of energy. If the present invention is employed in automobile engines, the fuel passes the magnetic field is ionized which features a foggy nature. The foggy fuel enters the engine and combust with the oxygen more completely to generate more horsepower.

In addition, the more complete combustion of the hydrocarbon molecules can reduce the amount of carbon monoxide and phytane released and thus can cut down on air pollution. As a result, carbon accumulation is reduced and the engine runs more smoothly and its life can be lengthened.

The conventional type of magnetic device only uses one piece of magnet and two pieces of iron which can not provide strong magnetic force generated by having two same pole repelling one another as the present invention does.

Although the invention has been explained in relation to the preferred embodiment, it is to be understood that many other possible modifications and variations can be made without departing from the spirit and scope of the invention as hereinafter claimed. The advantages of the present invention are:

1) having 50% stronger magnetic field more than the conventional ones;
2) it is hard to tell which is N or S pole and not convenient in installation in conventional device, it is not necessary to tell which is N or S pole since every side has the same pole in the present invention;
3) one set of the invention is equal to 2 sets of the conventional type;
4) if both the present invention and the conventional type have the same level of magnetic force of 12,000 gausses, the present invention has ⅓ more of penetration force compared to the conventional type, which is also effective if applied in bigger pipes;
5) it is necessary to discharge water if the concentration exceeds 1,000 PPM in conventional type applied in furnace. Because the present invention is more effective in removing rust due to its stronger magnetic field resulted in larger negative charge of ions, it is not necessary to discharge water until the concentration reaches 2,000 PPM, which can reduce waste of heat energy and thus is more practical in the industry;
6) the present invention still has a strong magnetic field even if applied in pipe with 6 inches of diameter;
7) if the present invention is applied in pipe system of furnace, it is not necessary to cleaned the pipes by acidic treatment and causes corrosion because of its strong magnetic field.

I claim:

1. A magnetic source device comprising:

a first iron piece of T-shaped section having an upper end, a lower end and a curved contact surface perpendicular to the upper end;

a pair of second iron pieces each having a body of L-shaped section, an upper end, a lower end, a sloped contact surface on the upper end toward inward relative to the first iron piece and a first screw hole transversely formed through the body;

a pair of permanent magnets each having a north pole and a south pole, said magnets being sandwiched by said first iron piece which located at center and the pair of second iron pieces which symmetrically located at lateral sides respectively with the north pole of the magnets facing each other and the south pole of the magnets facing the second iron pieces respectively;

a frame of U-shaped section wrapping the magnets and the first and second iron pieces and having a bottom and a pair of uprights each of which has a pair of second screw holes formed spaced apart in upper portion made engageable with the first screw holes of the second iron pieces respectively and fastened by a pair of bolts through the first and second screw holes;

whereby said magnetic source device is attached to outside of a pipe system to generate a ferromagnetic field inside pipe system to prevent scale and residue inside the pipe system.

* * * * *